(12) United States Patent
Zito (10) Patent No.: US 7,556,486 B1
(45) Date of Patent: Jul. 7, 2009

(54) REPAIR APPARATUS

(75) Inventor: Ronald James Zito, 7450 Jordan Rd., Grand Blanc, MI (US) 48439

(73) Assignee: Ronald James Zito, Grand Blanc, MI (US)

( * ) Notice: Subject to any disclaimer, the term of this patent is extended or adjusted under 35 U.S.C. 154(b) by 0 days.

(21) Appl. No.: 11/789,146

(22) Filed: Apr. 24, 2007

Related U.S. Application Data (60) Provisional application No. 60/815,925, filed on Jun. 24, 2006.

(51) Int. Cl.
*B29C 73/00* (2006.01)
*F27D 1/16* (2006.01)

(52) U.S. Cl. .................... 425/13; 425/11; 425/173; 138/97

(58) Field of Classification Search .................... 425/13, 425/173; 264/30, 36.21; 427/140; 138/97
See application file for complete search history.

(56) References Cited

U.S. PATENT DOCUMENTS

| | | | | |
|---|---|---|---|---|
| 4,012,822 A * | 3/1977 | Vrolyk et al. | ................. | 29/700 |
| 4,244,895 A | 1/1981 | Nakashin | ..................... | 264/36 |
| 4,245,970 A * | 1/1981 | St. Onge | ..................... | 425/13 |
| 4,280,861 A * | 7/1981 | Schwartz | ..................... | 156/382 |
| 4,370,113 A | 1/1983 | Nakashin | ..................... | 425/13 |
| 4,756,338 A | 7/1988 | Guyatt et al. | ................. | 138/99 |
| 4,840,551 A * | 6/1989 | Lay et al. | ....................... | 425/12 |
| 5,073,224 A * | 12/1991 | Addison et al. | ............. | 156/382 |
| 5,194,193 A | 3/1993 | Humphreys et al. | ........... | 264/35 |
| 5,527,169 A * | 6/1996 | Goldenberg et al. | .......... | 425/11 |
| 5,577,528 A | 11/1996 | Saha et al. | .................. | 137/315 |
| 5,624,206 A * | 4/1997 | Cohen et al. | ................ | 405/157 |
| 5,853,215 A * | 12/1998 | Lowery | ................... | 296/24.32 |
| 6,034,345 A * | 3/2000 | Firestone | ..................... | 219/98 |
| 6,336,472 B1 | 1/2002 | Eminger et al. | ............... | 138/99 |
| 7,169,439 B2 * | 1/2007 | Pendleton et al. | ........... | 427/140 |

FOREIGN PATENT DOCUMENTS

DE  003701155 A * 7/1988
JP  02003074811 A * 3/2003

* cited by examiner

*Primary Examiner*—Yogendra Gupta
*Assistant Examiner*—Emmanuel S Luk
(74) *Attorney, Agent, or Firm*—Mark A. Manley; George H. Morgan (57) ABSTRACT

A repair apparatus comprising a pressurized air inlet, an air regulator, a positioning ram, a repair material container, at least one window, a flexible seal, a shut off valve, a pop off relief valve, a ram seating attachment, a light, a supply nozzle, a pop off valve attachment fitting, an air regulator attachment fitting, a repair flow control, a supply nozzle attachment fitting, a seal, a compression nut, an optional pressure plate, an air hose, a repair material reservoir, a pressure plate nozzle clearance, material supply containers, pumps, feeder lines, a mixing tee, and check valves.

14 Claims, 10 Drawing Sheets

REPAIR APPARATUS

CROSS REFERENCES TO RELATED APPLICATIONS

Provisional Application for Patent No. 60/815,925, filed Jun. 24, 2006, with the title, "Concrete Repair Apparatus" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a repair apparatus that forces a repair material, such as, but not restricted to, grout, epoxy resins, or other resin or elastomeric materials under pressure, into a crack in a surface, such as, but not restricted to, a surface such as a wall, a floor, or a pipe.

2. Background Information

Repairing a crack in a surface such as, but not restricted to, a foundation wall, a floor, or a pipe, especially when water is flowing through the crack is a problem. Repairing such cracks presently often involves digging dirt from an outside surface, if possible, trying to patch the wall, and then, in the case of concrete structures, applying a liquid polymer coating over a repaired area to preclude leakage of moisture through the surface area involved.

As will be seen in the subsequent description of the preferred embodiments of the present invention, the present invention overcomes shortcomings of prior art.

SUMMARY OF THE INVENTION

The present invention in the preferred embodiment is a repair apparatus comprising a pressurized air inlet, an air regulator, a positioning ram, at least one repair material container, at least one window, a flexible seal, a shut off valve, a pop off relief valve, a ram seating attachment, a light, a supply nozzle, a pop off valve attachment fitting, an air regulator attachment fitting, a repair material flow control, a supply nozzle attachment fitting, a seal, a compression nut, an optional pressure plate, an air hose, a repair material reservoir, a pressure plate nozzle clearance, at least one material pump, at least one feed line, at least one check valve, and a mixing T.

The repair materials can be, but are not restricted to, one or two component grouts (for concrete surface repair), epoxy resins, other resins, or polymers.

DESCRIPTION OF THE PREFERRED EMBODIMENTS

Referring to FIGS. 1 through 9, the preferred embodiment of the present invention, a repair apparatus 1 comprises a pressurized air inlet 2, an air regulator 3, a positioning ram 4, at least one observation window 6, a flexible seal 7, a shut off valve 8, a pop off relief valve 9, a ram seating attachment 10, a light 11, a movable supply nozzle 12, a pop off valve attachment fitting 13, an air regulator attachment fitting 14, a supply nozzle attachment fitting 16, a flexible nozzle seal 17, a compression nut 18, an optional pressure plate 19, an air hose 23, a repair material reservoir 24, a pressure plate nozzle clearance 25, a walled box housing 26, plate bolts 31, a plate seal 32, plate mount angles 33, mount angle bolt apertures 34, plate bolt apertures 35, a repair material mixing T 36, one way check valves 37, feed lines 38, repair material pumps 39, a repair material supply container 40, and a repair material hardener container 41.

Figure 7:
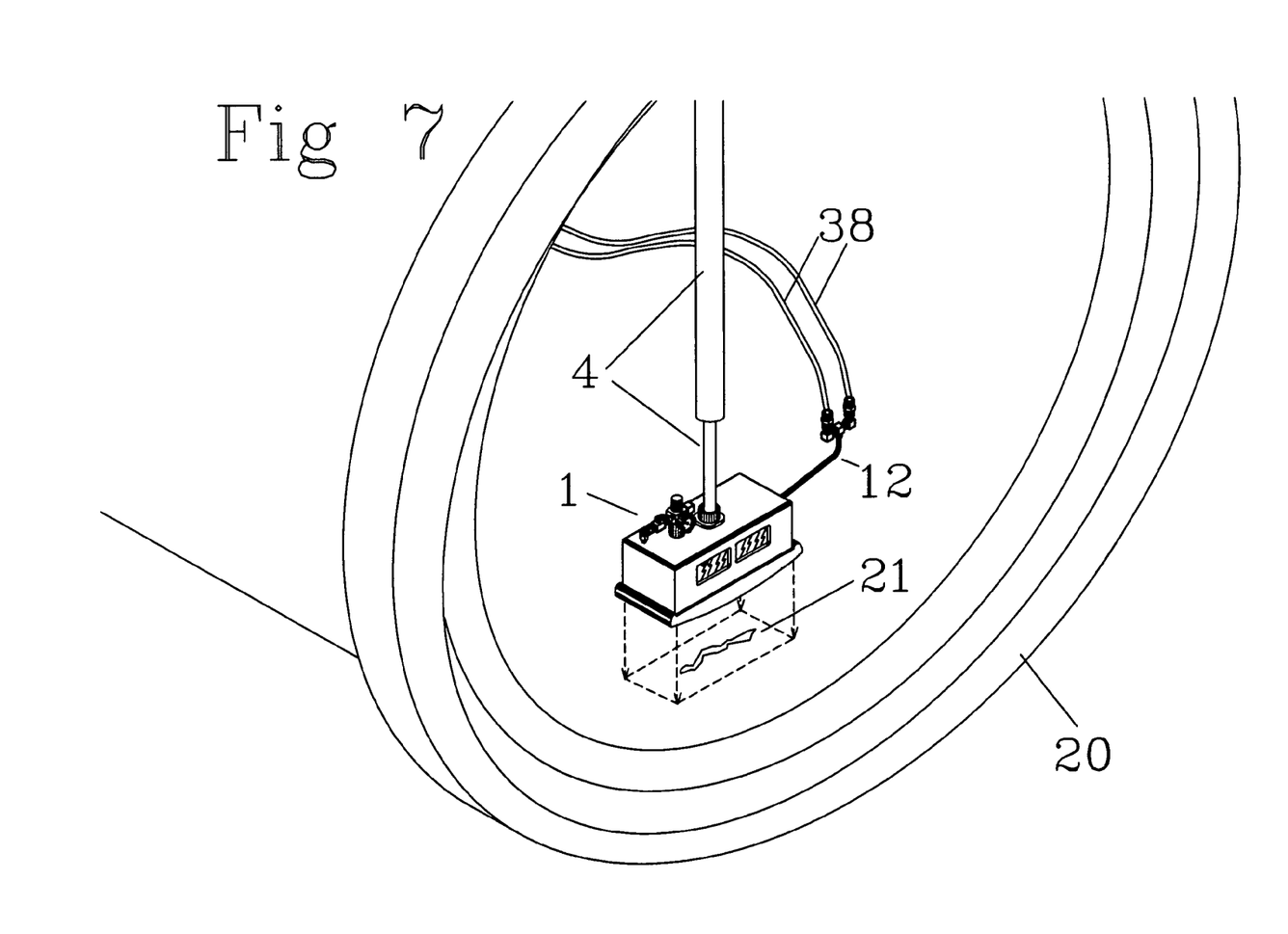
FIGS. 7 through 9 illustrate uses of the repair apparatus in repairing a crack in a pipe.
Figure 8:
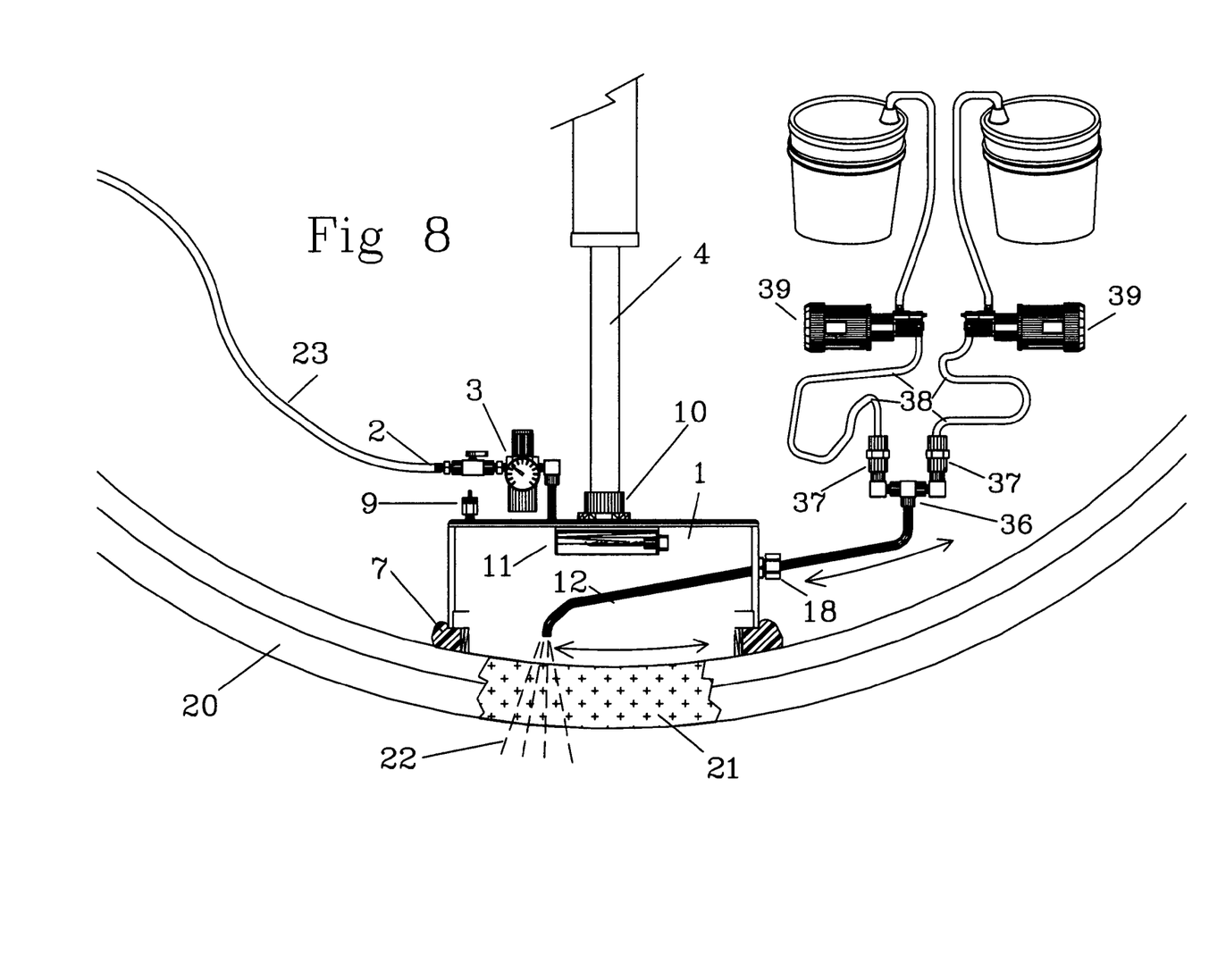
Figure 9:
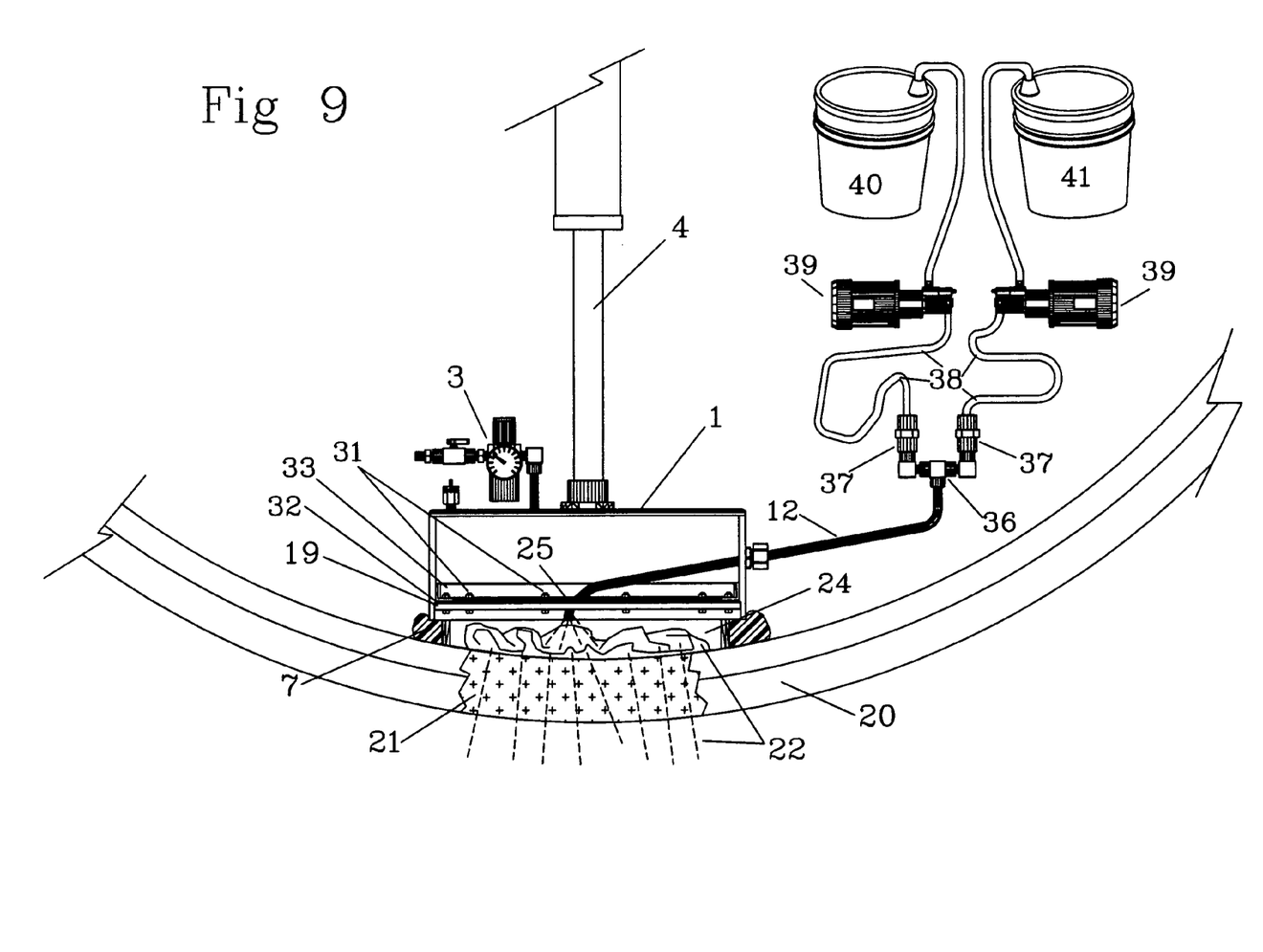

Referring FIGS. 7 through 9, uses of the repair apparatus 1 to repair a crack 21 in a pipe 20 are illustrated.

The repair apparatus 1 is positioned over the crack 21. The positioning ram 4, seated in the ram seating attachment 10, is used to hold the repair apparatus 1 in position. The ram 4 is braced against the ceiling (not shown) of the pipe 20.

When a two component repair material 22 is used, the repair material 22 is formed from the two components of the repair material pumped from the repair material supply container 40 and the repair material hardener container 41, by the pumps 39 through the feed lines 38, through the one way check valves 37, through the repair material mixing T 36, through the supply nozzle 22.

In FIG. 8, for the repair of a crack 21 where water flow is not much of a problem, the optional pressure plate 19 is not used. Pressurized air is supplied through the air hose 23, through the pressurized air inlet 2, through the air regulator 3, into the repair apparatus 1.

Figure 1:
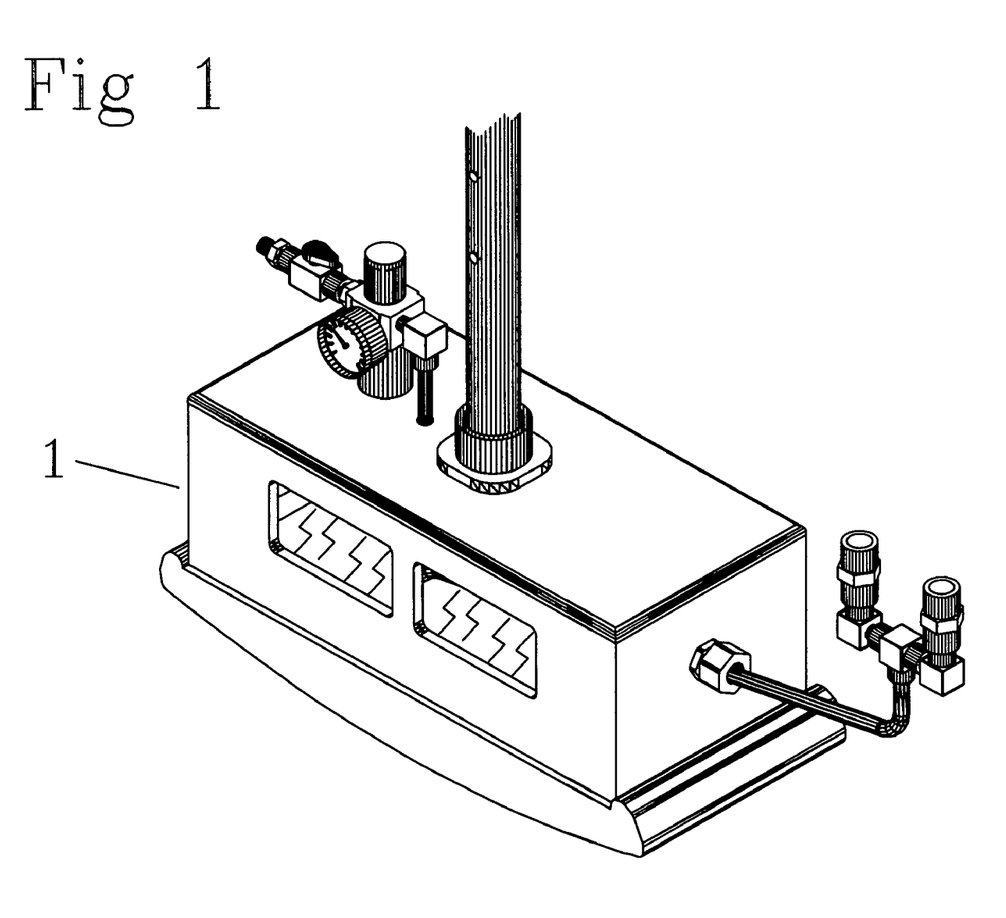
FIGS. 1 through 4 illustrate the preferred embodiment of the present invention, a repair apparatus.
Figure 2:
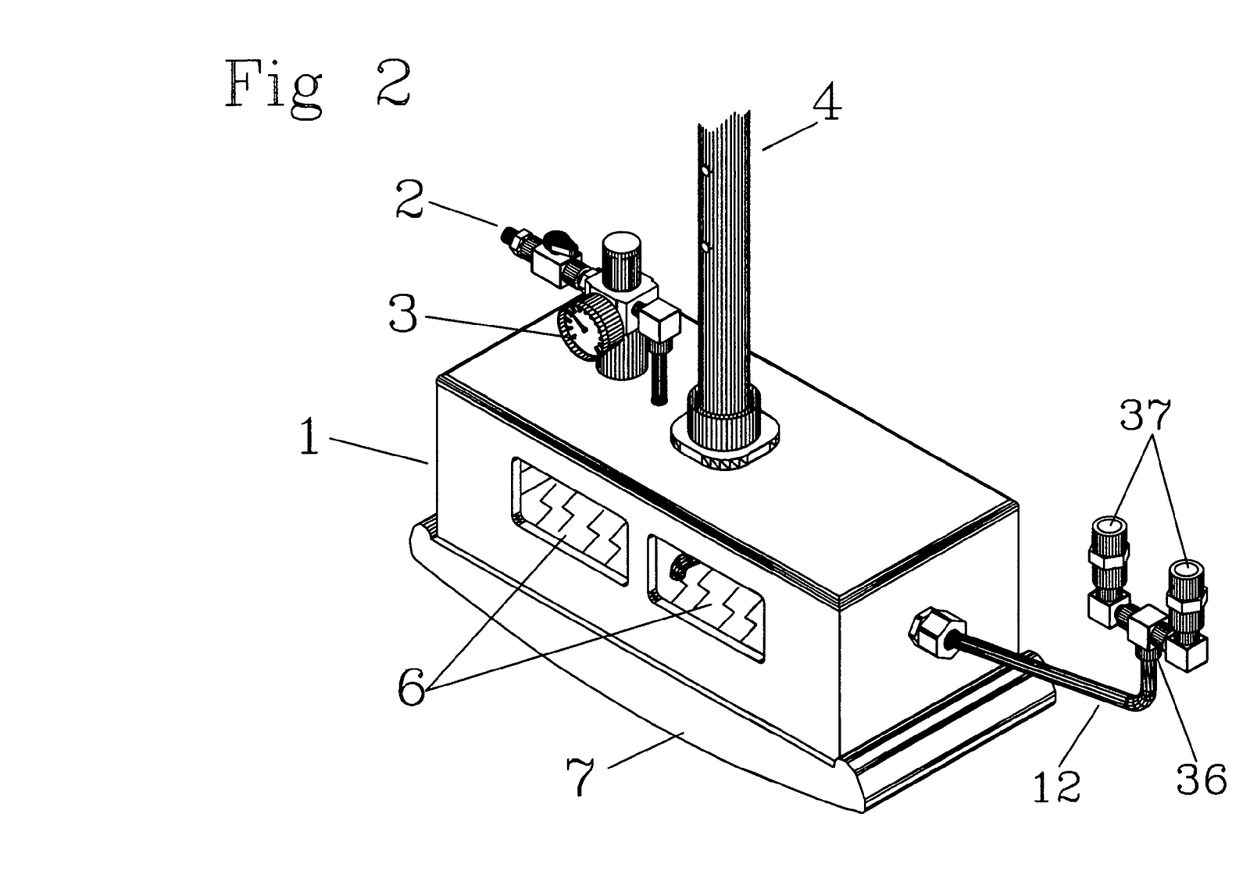
Figure 3:
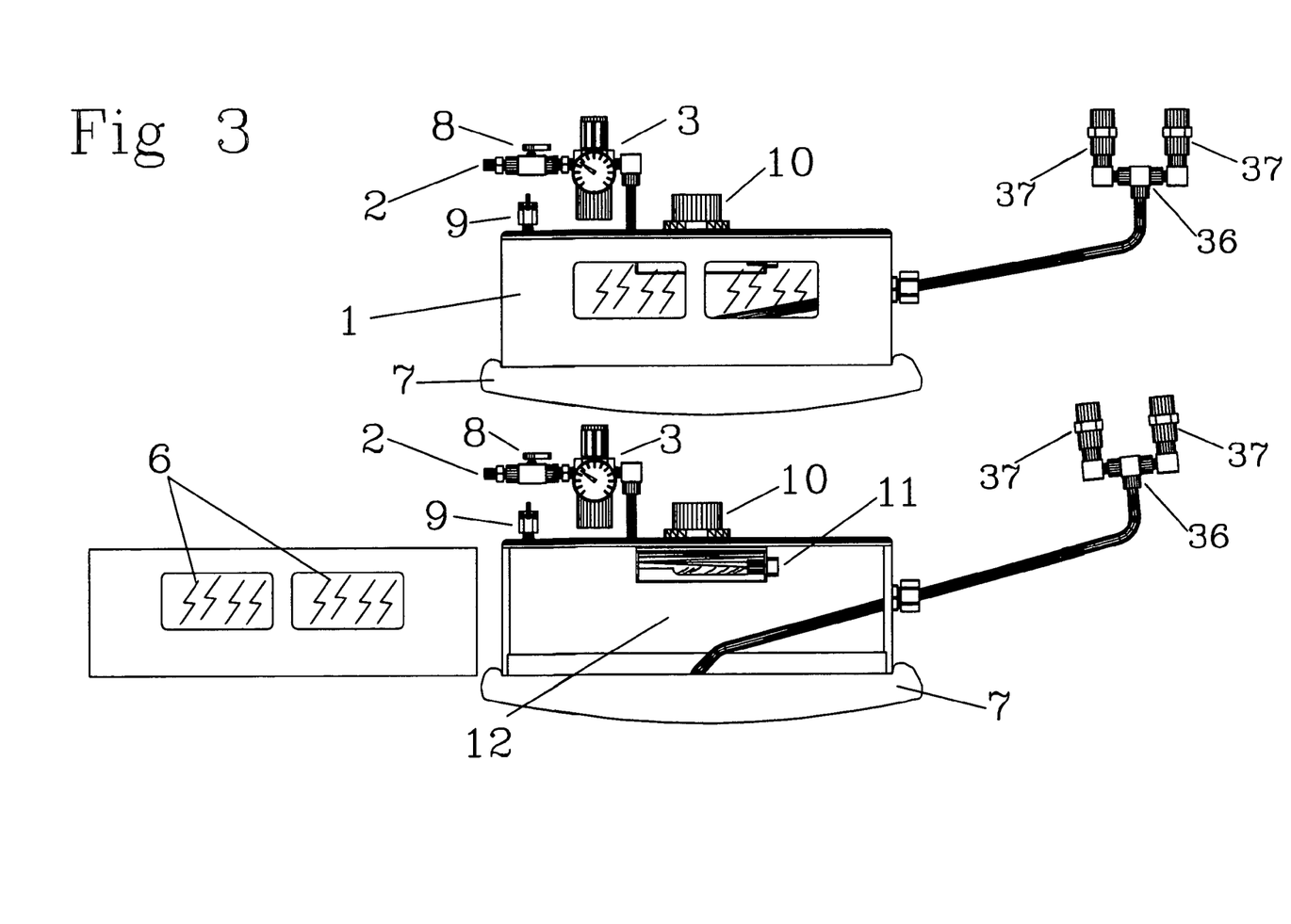
Figure 4:
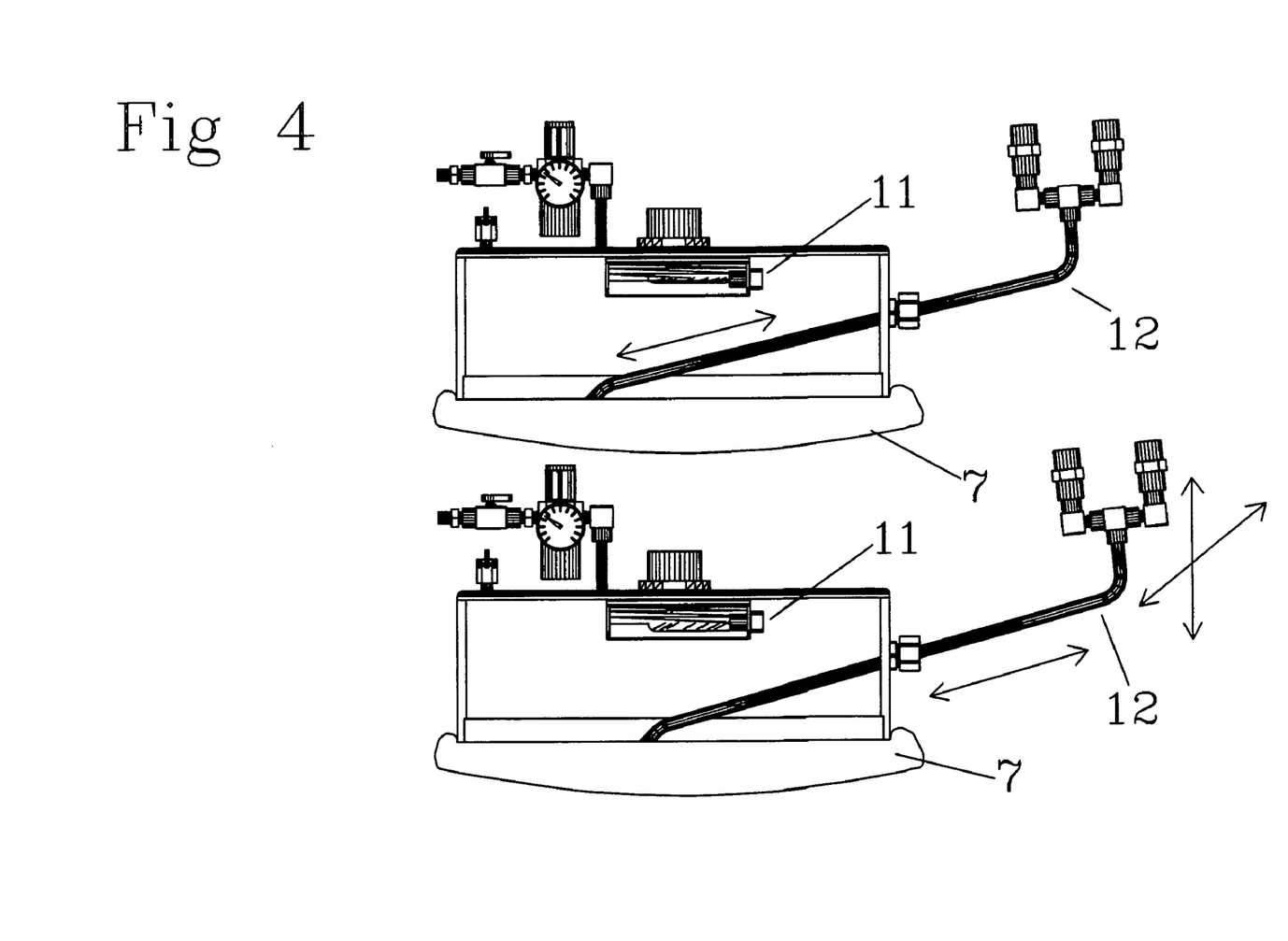
Figure 5:
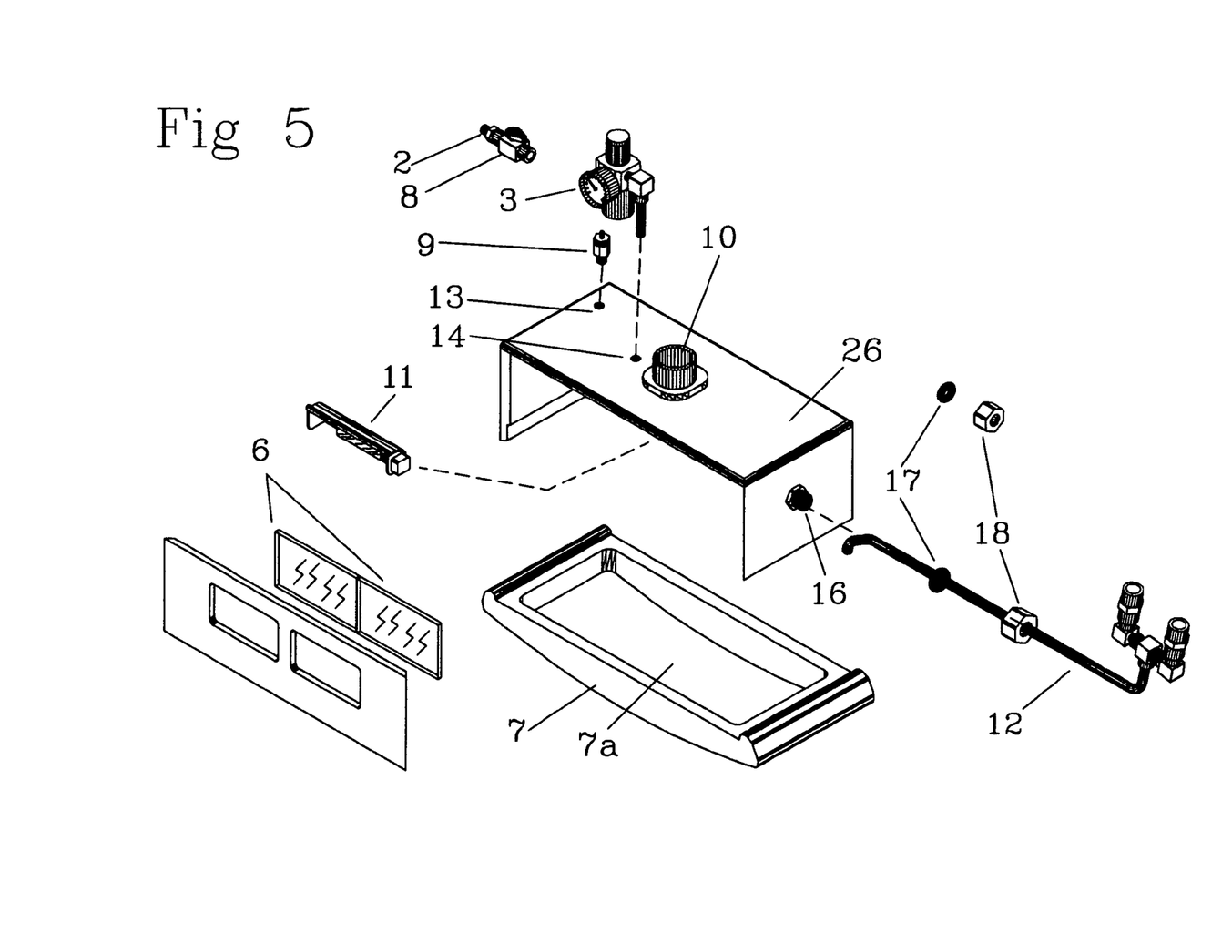
FIG. 5 is an exploded view of the repair apparatus.

An operator can manipulate the movable supply nozzle 12 up and down, in and out, left and right (Ref. FIG. 4) to reach any point on the pipe surface exposed within the sealed opening 7a of the housing 26, while observing the supply nozzle 12 through the at least one observation window 6, with the aid of the light 11. The operator places the end of the nozzle 12 on the crack 21 and follows the crack as grout flows from the nozzle 12 and is forced by air pressure into the crack. The flexible nozzle seal 17 and nozzle attachment 16 allow for the movement of the nozzle 12 without leaking air from the housing 26.

For a pipe 20 that is of concrete, 30 psi is a typical pumping pressure for pumping the repair material 22.

The air regulator 3 serves to regulate air pressure at flow sufficient to stop ground water inflow, if ground water is present, and force the repair material 22 into the crack 21.

The flexible seal 7 serves to co-operate with the air regulator 3 in maintaining air pressure required to stop ground water inflow, when ground water is present, and force the repair material 22 into the crack 21, reducing the volume of air flow that would otherwise be required.

The flexible seal 7 is replaceable so a given seal 7 can be installed that conforms to a given surface contour to be repaired.

Applicant's experience is that air pressure in the order of 3 to 10 psi works well when using grout to repair a pipe 20 that is a concrete pipe.

The light 11 illuminates the repair process so the operator can observe the process, through the at least one observation window 6.

For a small crack 21, the operator may prefer to not use the plate 19 so the operator can maneuver the supply nozzle 12 to effect a repair using less repair material 22, as indicated in FIG. 8.

Figure 6:
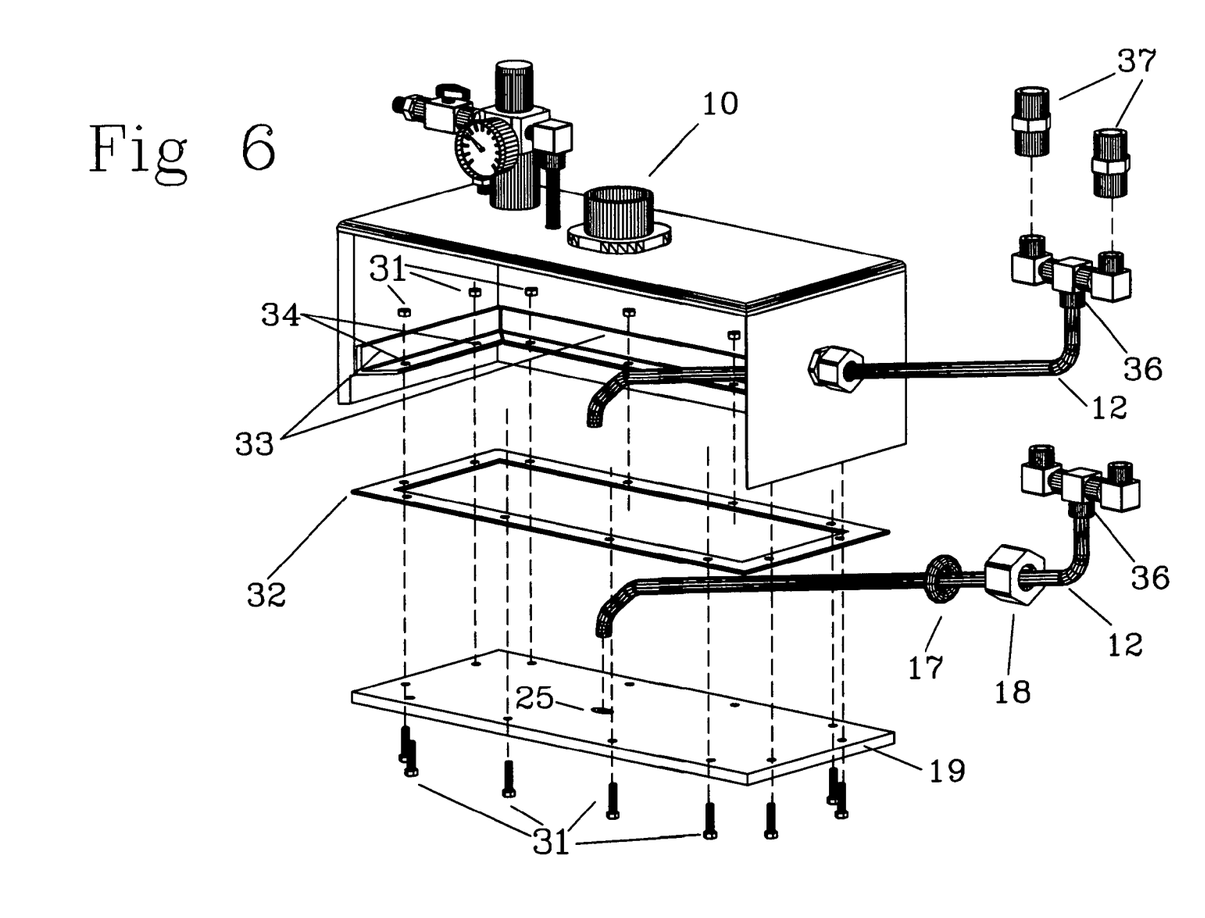
FIG. 6 is a cutaway/exploded view of the repair apparatus with an optional pressure plate.

For a larger crack 21, where more repair material 22 is required, or in cases where water flow is significant, the operator may prefer to use the plate 19, as indicated in FIGS. 6 and 9. Repair material is still supplied through the nozzle 12, which passes through the central hole 25 in plate 19. The plate 19 is held in place in the walled box housing 26 by lip 33. Material supplied under pressure by nozzle 12 will build pressure under the plate 19 and thus force repair material through the crack 21.

In this case, the pressure plate 19 is used. Instead of pressured air through the regulator 3, pressure resulting from the repair material filling the repair material reservoir 24, which is formed by the optional pressure plate in conjunction with the seal 7 and the pipe 20, serves to force the repair material 22 through the crack 21, stopping water flow and repairing the pipe 20.

Figure 10:
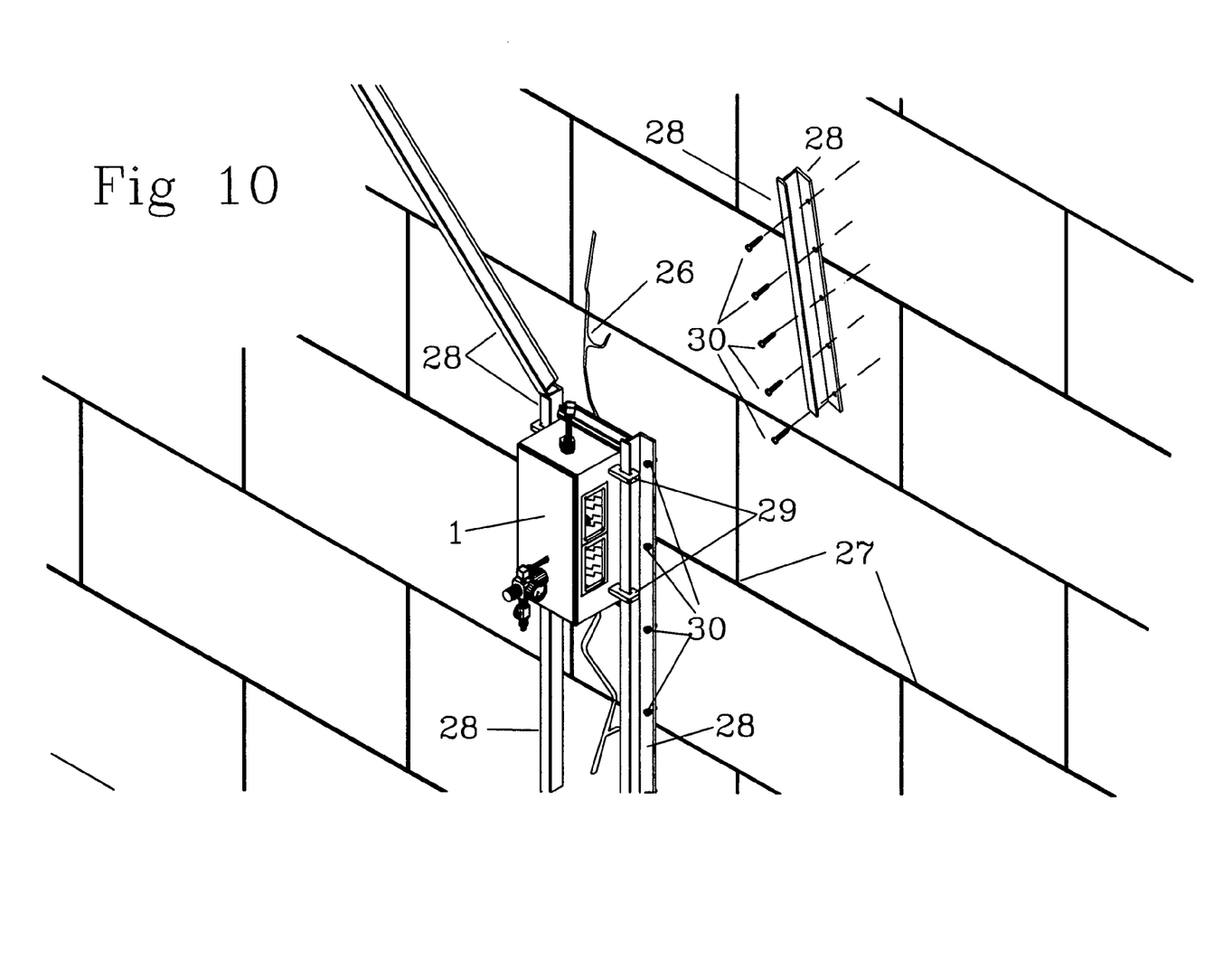
FIG. 10 illustrates the use of the repair apparatus in repairing a crack in a wall.

Referring to FIG. 10, the repair apparatus 1 is shown in position for repair of a wall crack 26 in a wall 27. Brackets 29 are added to the apparatus 1 that hold the apparatus 1 to tracks 28 attached to the wall 27 with attachment anchors 30. The brackets 29 are typically removed after repair of the wall crack 26.

The repair apparatus 1 structural materials are typically steel. However, as obvious to anyone skilled in the art, a variety of structural materials are applicable, such as, but not restricted to, aluminum, copper, or fiberglass reinforced plastic, as examples.

The repair material 22 composition, as obvious to anyone skilled in the art, depends on what is being repaired. Grout works for concrete. Other materials, such as, but not restricted to, epoxies, resins, or elastomeric materials work for other surfaces.

Although the description above contains many specificities, these should not be construed as limiting the scope of the invention but as merely providing illustrations of some of the presently preferred embodiments of this invention.

For example, in the preferred embodiment of the present invention, the flexible seal 7 is of rubber. However, as obvious to anyone skilled in the art, other materials such as, but not restricted to, a variety of rubber or cross linked plastic compounds could serve the intended purpose.

Also, the description discusses the use of a two component repair material using pumps and check valves and a mixing T. As obvious to anyone skilled in the art, a single component repair material will suffice in some cases and a hand pump is usable in some cases also. In such cases, dual pumps, the check valves, and a mixing T would not be used.

It will be obvious to those skilled in the art that modifications may be made to the embodiments described above without departing from the scope of the present invention.

Also, the positioning ram 4 could be an air, fluid, electric, or even a mechanically powered ram, or even a brace.

Thus the scope of the invention should be determined by the appended claims in the formal application and their legal equivalents, rather than by the examples given.

I claim:

1. A repair apparatus for use inside a pipe comprising:
    a) a pressurized air inlet;
    b) an air regulator;
    c) a walled housing adapted to seal against an inside surface of said pipe;
    d) a supply nozzle;
    wherein the air regulator regulates a first air pressure within the walled housing sufficiently for air pressure to stop ground water inflow, when ground water is present, as well as to force repair material into a cracked surface; and
    an opening, said opening surrounded by a sealing surface, wherein the supply nozzle can be manipulated up and down, in and out, and left and right within said housing while said sealing surface maintains a seal with said cracked surface, for placement of repair material pumped at a second pressure higher than said first pressure through the grout container through the supply nozzle,
    at least one observation window and a light in the housing, enabling an operator to observe movement of the nozzle along a crack as material flows into the crack.

2. The repair apparatus of claim 1 further wherein said seal is a
    flexible seal that serves to co-operate with the air regulator in maintaining air pressure required to stop ground water inflow into said housing, when ground water is present, as well
    as to force repair material into the crack in a surface, reducing the volume of air flow that would otherwise be required; and
    wherein the seal is a replaceable seal so the seal can be installed as required to conform to a given surface to be repaired.

3. The repair apparatus of claim 1 further comprising a ram
    seating attachment to enable placement of a ram as a brace between the repair apparatus and an inside portion of a pipe,
    holding the repair apparatus in position against said first pressure.

4. The repair apparatus in claim 1 wherein the repair
    apparatus is used as a concrete repair apparatus using grout as the repair material and wherein a plate is installed to cover said opening, wherein said plate has a single hole to allow the nozzle to apply repair material through said plate.

5. A surface repair apparatus for repairing a crack in a pipe comprising;
    a) a pressurized air inlet;
    b) a grout supply;
    c) a pressurized supply nozzle;
    wherein the repair apparatus includes a housing having an opening and a sealing surface surrounding the opening, said supply nozzle connected to said grout supply; said nozzle is movable within said housing to reach a plurality of points in said opening;
    said pressurized air inlet supplying pressurized air to said housing to maintain a first high pressure in said housing and said opening such that grout placed on a crack covered by said opening will flow from said nozzle at a second pressure higher than said first high pressure and from said first high pressure in said housing through said crack towards a lower pressure outside said pipe and such that when said crack is exposed within said opening and said sealing surface is pressed against said work surface to establish a seal and said supply nozzle is free to move to a plurality of points along said crack while said housing is stationary and said seal is maintained at least one observation window and a light in the housing, enabling an operator to observe movement of the nozzle along a crack as material flows into the crack.

6. The surface repair apparatus of claim 5 wherein said seal includes a radiused surface adapted to fit against an interior surface of a pipe and wherein said first pressure will stop ground water inflow.

7. The surface repair apparatus of claim 5 including a positioning ram adapted to hold said opening against said surface such that said seal is sealed against said surface against said first pressure.

8. The surface repair apparatus of claim 5 wherein the supply nozzle passes through a second seal in a wall of said repair apparatus.

9. The surface repair apparatus of claim 5 wherein the apparatus includes a light adjacent said opening.

10. The surface repair apparatus of claim 5 wherein said grout supply includes two liquid parts mixed at a mixing T and wherein a plate is installed inside said housing to cover said opening, wherein said plate has a single hole to allow the nozzle to apply repair material through said plate.

11. A pipe repair apparatus comprising;

a supply of flowable repair material and a pressurized supply nozzle;

wherein the repair apparatus includes a pressurized housing pressurized at a first pressure and an opening in said housing and a seal surrounding the opening, said supply nozzle connected to said supply of flowable repair material, said nozzle, supplying material at a second pressure higher than said first pressure, and said nozzle is movable within said housing along an inside pipe surface to apply flowable material to a plurality of points on said inside pipe surface exposed in said opening at least one observation window and a light in the housing, enabling an operator to observe movement of the nozzle along a crack as material flows into the crack.

12. The repair apparatus of claim 11 wherein said apparatus includes a window in said housing adjacent said opening.

13. The repair apparatus of claim 12 wherein said seal includes a seal surface adapted to sealingly fit against said inside pipe surface and wherein a plate is installed inside said housing to cover said opening, wherein said plate has a single hole to allow the nozzle to apply repair material through said plate.

14. The repair apparatus of claim 13 including a positioning ram adapted to hold said opening against said inside pipe surface against said first pressure such that said seal is sealed against said surface.

* * * * *